United States Patent
Liu et al.

(10) Patent No.: US 11,496,247 B2
(45) Date of Patent: Nov. 8, 2022

(54) CODEBOOK FEEDBACK FOR DATA RETRANSMISSIONS

(71) Applicant: ZTE CORPORATION, Guangdong (CN)

(72) Inventors: Xing Liu, Guangdong (CN); Peng Hao, Guangdong (CN); Wei Gou, Guangdong (CN); Feng Bi, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 195 days.

(21) Appl. No.: 16/842,339

(22) Filed: Apr. 7, 2020

(65) Prior Publication Data
US 2020/0235866 A1 Jul. 23, 2020

Related U.S. Application Data

(63) Continuation of application No. PCT/CN2017/111729, filed on Nov. 17, 2017.

(51) Int. Cl.
*H04L 1/18* (2006.01)
*H04L 1/16* (2006.01)
(Continued)

(52) U.S. Cl.
CPC .......... *H04L 1/1812* (2013.01); *H04L 1/1607* (2013.01); *H04L 1/1854* (2013.01);
(Continued)

(58) Field of Classification Search
CPC combination set(s) only.
See application file for complete search history.

(56) References Cited

U.S. PATENT DOCUMENTS 9,258,805 B2 * 2/2016 He .................. H04W 52/02
9,913,254 B2 * 3/2018 Zhang ............ H04W 72/1294
(Continued)

FOREIGN PATENT DOCUMENTS

CN 103797747 A 5/2014
CN 104823499 A 8/2015
(Continued)

OTHER PUBLICATIONS

Catt, "Multiplexing of UCI and UL data on PUSCH", R1-1717831, 3GPP TSG RAN WG1Meeting 90bis; Prague, CZ; 20171009-20171013 Oct. 8, 2017 (Oct. 8, 2017), 5 pages.
(Continued)

*Primary Examiner* — Hanh N Nguyen
(74) *Attorney, Agent, or Firm* — Duane Morris LLP

(57) ABSTRACT

A system and method for codebook feedback for data retransmissions are disclosed herein. In one embodiment, a method performed by communication device includes: receiving at least one of first downlink information and second downlink information from a communication node, wherein: the first downlink information is received before uplink grant information is received, and the second downlink information is received after the uplink grant information is received; generating at least one hybrid automatic repeat request acknowledgement (HARQ ACK), wherein the at least one HARQ ACK comprises at least one of: a first feedback information corresponding to the first downlink information, and a second feedback information corresponding to the second downlink information; and sending the HARQ ACK to the communication node in a feedback slot based on an uplink feedback timing indicated in the uplink grant information.

12 Claims, 8 Drawing Sheets

(51) Int. Cl.
*H04L 5/00* (2006.01)
*H04W 72/04* (2009.01)

(52) U.S. Cl.
CPC .......... *H04L 1/1861* (2013.01); *H04L 5/0055* (2013.01); *H04L 5/0094* (2013.01); *H04W 72/042* (2013.01); *H04W 72/0413* (2013.01)

(56) References Cited

U.S. PATENT DOCUMENTS

| | | | |
|---|---|---|---|
| 10,200,179 B2* | 2/2019 | Li | H04L 1/1896 |
| 10,225,050 B2* | 3/2019 | Guan | H04L 1/1864 |
| 2013/0028205 A1 | 1/2013 | Damnjanovic | |
| 2014/0036814 A1 | 2/2014 | Zhang | |
| 2016/0226630 A1 | 8/2016 | Zhang et al. | |
| 2017/0134140 A1 | 5/2017 | Park | |
| 2019/0159251 A1 | 5/2019 | Li et al. | |

FOREIGN PATENT DOCUMENTS

| | | |
|---|---|---|
| CN | 106559187 A | 4/2017 |
| CN | 106900059 A | 6/2017 |
| CN | 107332646 A | 11/2017 |
| EP | 3214790 A2 | 9/2017 |
| WO | 2014003456 A1 | 1/2014 |
| WO | 2017078454 A1 | 5/2017 |
| WO | 2017101569 A | 6/2017 |
| WO | 2017172488 A1 | 10/2017 |

OTHER PUBLICATIONS

Qualcomm Incorporated "Summary of remaining issues for UCI piggyback on PUSCH", R1-1718931, 3GPP TSG RAN WG1 Meeting 90bis; Prague, CZ; 20171009-20171013, Oct. 11, 2017 (Oct. 11, 2017), 3 pages.

Ericsson On UCI on PUSCH, R1-1718638, 3GPP TSG RAN WG1 Meeting 90bis; Prague, CZ; 20171009-20171013 Oct. 8, 2017 (Oct. 8, 2017), 7 pages.

Catt "Discussion on HARQ management and HARQ-ACK feedback", R1-1717834, 3GPP TSG RAN WG1 Meeting #90bis, Prague, CZ, Oct. 13, 2017, 7 pages.

NTT Docomo, Inc. "HARQ-ACK feedback", R1-1716105, 3GPP TSG RAN WG1 NR Ad-Hoc#3, Nagoya, Japan, Sep. 21, 2017, 11 pages.

MediaTek Inc. "Discussion on UCI multiplexing", R1-1718342, 3GPP TSG RAN WG1 Meeting 90bis; Prague, CZ Oct. 9, 2017-Oct. 13, 2017, Oct. 11, 2017 (Oct. 11, 2017), 11 pages.

* cited by examiner

CODEBOOK FEEDBACK FOR DATA RETRANSMISSIONS

TECHNICAL FIELD

This disclosure relates generally to wireless communications and, more particularly, to systems and methods for codebook feedback for data retransmissions.

BACKGROUND

Current mobile networks may be able to provide mobile users with data transmission service via almost ubiquitous radio access. However, users continue to demand higher and higher data rates. To meet user demand, different techniques have been developed to increase the data rate and reliability of data transmissions between the network and an individual user equipment (UE). For example, a hybrid automatic repeat request (HARQ) may be included in the media access control (MAC) and physical (PHY) layers to increase the reliability of data transmissions.

In traditional LTE systems, HARQ feedback by a UE or a terminal may be based on a transmission block (TB). Under a time domain duplex (TDD) mode, there may be cases where more than one downlink (DL) slot may correspond to only one uplink (UL) feedback time slot for a UE. Accordingly, feedback for multiple downlink transmissions may be aggregated into a HARQ feedback codebook and transmitted in one uplink transmission resource (e.g., within a physical uplink control channel or physical uplink shared channel). This feedback codebook may have a size that refers to a number of bits in the codebook. The feedback codebook size may depend on the number of downlink transmission slots within the feedback window and the number of codewords for each slot. In carrier aggregation (CA) use cases, a feedback codebook size may also relate to the number of component carriers (CCs). A base station (BS) and a UE may have a unified (e.g., mutual) understanding of the size and bit order of the feedback codebook, so as to avoid false retransmissions. The bit order of the feedback codebook may refer to a relationship between each bit in a codebook and associated DL slot. For simplicity of discussion, a DL slot may refer to a slot (e.g., a timeslot) with a DL assignment (i.e. DL data transmission in PDSCH). Similarly, an UL slot may refer to a slot with a UL data transmission in PUSCH or UL HARQ feedback in PUCCH or PUSCH. Also, the term HARQ feedback codebook may be interchangeably termed more simply as a feedback codebook for simplicity. Similarly, HARQ feedback may be interchangeably termed more simply as feedback for simplicity.

Typical feedback codebook determination methods include a UE providing feedback for all DL slots within a time window, even if the time window does not include a DL slot. Furthermore, not all downlink resources are necessarily scheduled for a UE within a time window. Accordingly, some of such feedback bits of a feedback codebook may provide useless information as they are not associated with a downlink transmission for the UE providing feedback.

Accordingly, another typical HARQ feedback codebook determination method may include adding a downlink assignment index (DAI) indication field into downlink control information (DCI) sent to a UE. This DAI may indicate slot based DL scheduling to the UE so that the UE may determine which slots may be included in a feedback codebook. This technique may avoid the sending of useless feedback bits in a feedback codebook as the relevant DL slots to a feedback codebook may be indicated. However, the introduction of the DAI also increases the overhead of the DCI.

In typical 5G new radio (NR) a base station (BS) may indicate UL HARQ feedback timing values (e.g., a feedback slot for transmission of a feedback codebook) via radio resource control (RRC) signaling semi-statically to a UE. Also, a BS may indicate a specific UL HARQ feedback timing value (e.g., a relationship between a particular slot and the feedback slot for transmission of a feedback codebook) by a DCI dynamically. This makes feedback timing, and an associated feedback codebook size, more flexible and more complex than previous generation communication standards.

In a traditional Long Term Evolution (LTE) standard, a HARQ feedback codebook and uplink data may be scheduled within a same UL time slot and both transmitted in a physical uplink shared channel (PUSCH). Also, UL data resource may be punctured by a HARQ feedback codebook resources or UL data resources may be transmitted by rate matching with resources of a HARQ feedback codebook. For a UE scheduled to provide feedback in the PUSCH, DL slots after a UL grant are typically not characterized in a feedback codebook at a feedback slot that follows the UL grant. Accordingly, a total DAI may be transmitted together with a UL grant in a DCI and a number of all the DL assignments (e.g., DL slots) for inclusion in a feedback codebook may be indicated by a total DAI value or field. Accordingly, a UE may determine a HARQ feedback codebook size based on the total DAI value. However, in NR, there may be further DL assignments (e.g., DL slots) between a UL grant and feedback slot carrying a feedback codebook. These further DL assignments are not present in traditional LTE systems. Accordingly, it may be desirable to provide feedback for DL assignments (e.g., DL slots) that are both before and after an UL grant slot (e.g., a slot of a UL grant), instead of just before the UL grant slot. For simplicity, these DL assignments for DL slots after a UL grant may be referred to as post UL grant DL slots.

In current discussions around 5G NR systems, HARQ feedback codebooks that account for post UL grant DL slots may have one of six features. As a first feature, when there are post UL grant DL slots, and if both total DAI and a last counter DAI indicates that an acknowledgement/negative acknowledgement (ACK/NACK) size is up to 2 bits (e.g., that an ACK may be indicated with up to 2 bits), the ACK/NACK within a feedback codebook may be transmitted by puncturing a PUSCH, otherwise a UE may treat the post UL grant DL slots as an error event. How to handle the error event is up to UE implementation. As a second feature, if post UL grant DL slots are supported (e.g., included in a feedback codebook), limit to up to 2 ACK/NACK bits to indicate the post UL grant DL slots. Bits for post UL grant DL slots indicated in a ACK/NACK may puncture their associated PUSCH. As a third feature, a UL grant may indicate a maximum number of post UL grant DL slots. An error event may occur if an actual received number of post UL grant DL slots exceeds the max number. As a fourth feature, RRC may be utilized to indicate a maximum number of allowed post UL grant DL slots. As a fifth feature, a total DAI, together with ACK/NACK size indicator (contained in UL grant) determines the size of the feedback codebook (e.g., HARQ codebook) to be used for uplink control information (UCI) on PUSCH.

The above features designate limitations on post UL grant DL slots to avoid different understandings between a BS and UE on feedback codebook size to account for post UL grant DL slots. For example, features one and two make the limitation on DL assignments though specification. Also, features three and six limit the DL assignment by UL grant. Feature four provides limitations by RRC signaling. Also, feature five provides limitations by DL assignment. However, none of these features in current discussions describes a complete methodology of including post UL grant DL slots in a feedback codebook.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by communication device includes: receiving at least one of first downlink information and second downlink information from a communication node, wherein: the first downlink information is received before uplink grant information is received, and the second downlink information is received after the uplink grant information is received; generating at least one hybrid automatic repeat request acknowledgement (HARQ ACK), wherein the at least one HARQ ACK comprises at least one of: a first feedback information corresponding to the first downlink information, and a second feedback information corresponding to the second downlink information; and sending the HARQ ACK to the communication node in a feedback slot based on an uplink feedback timing indicated in the uplink grant information.

In a further embodiment, a method performed by a communication node includes: sending at least one of first downlink information and second downlink information to a communication device, wherein: the first downlink information is received before uplink grant information is received, and the second downlink information is received after the uplink grant information is received; and receiving at least one hybrid automatic repeat request acknowledgement (HARQ ACK) in a feedback slot based on an uplink feedback timing, wherein the at least one HARQ ACK comprises at least one of: a first feedback information corresponding to the first downlink information, and a second feedback information corresponding to the second downlink information.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
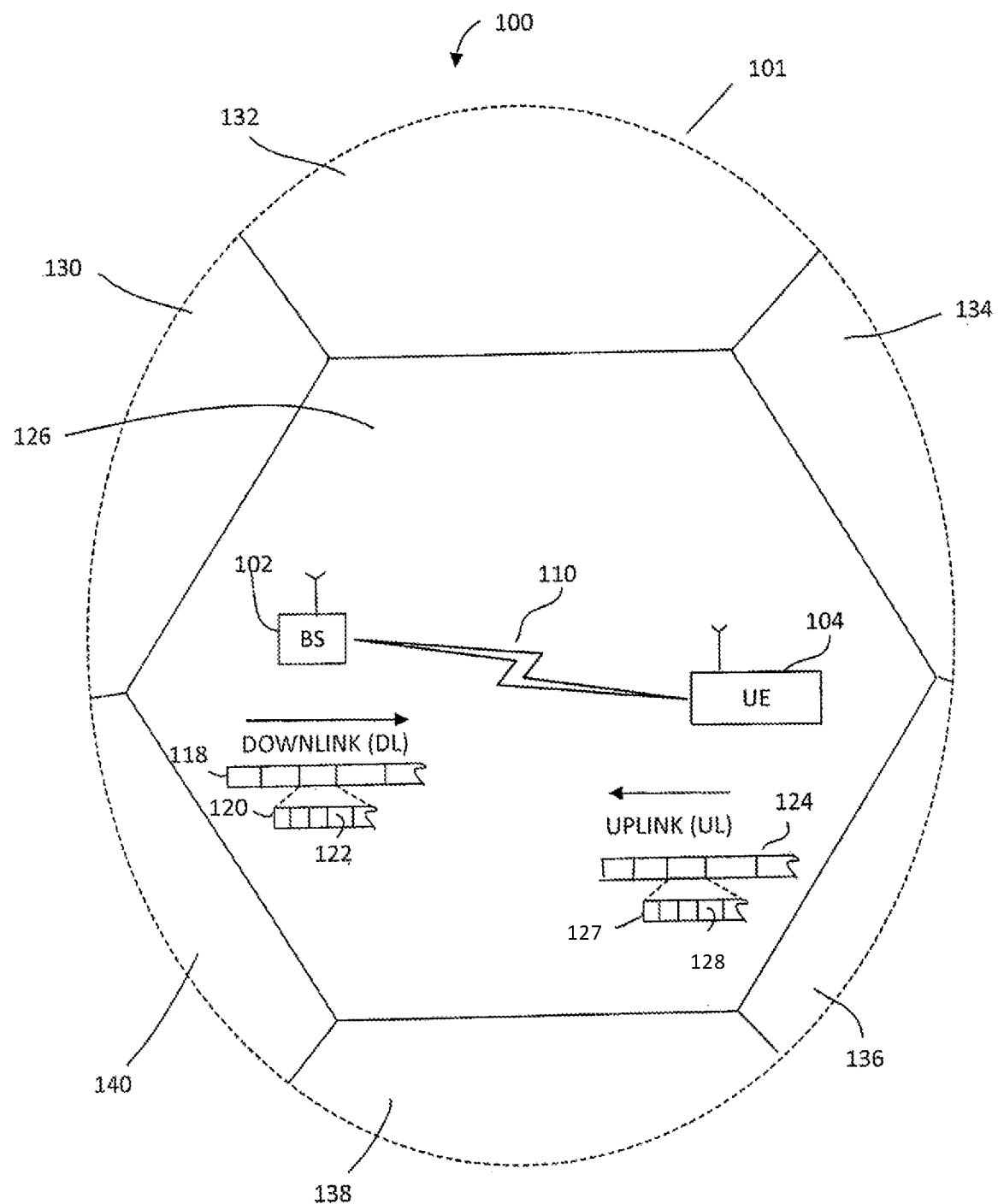
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. Such an exemplary network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. A UE 104 may undergo a random access procedure to join the network 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention.

Figure 2:
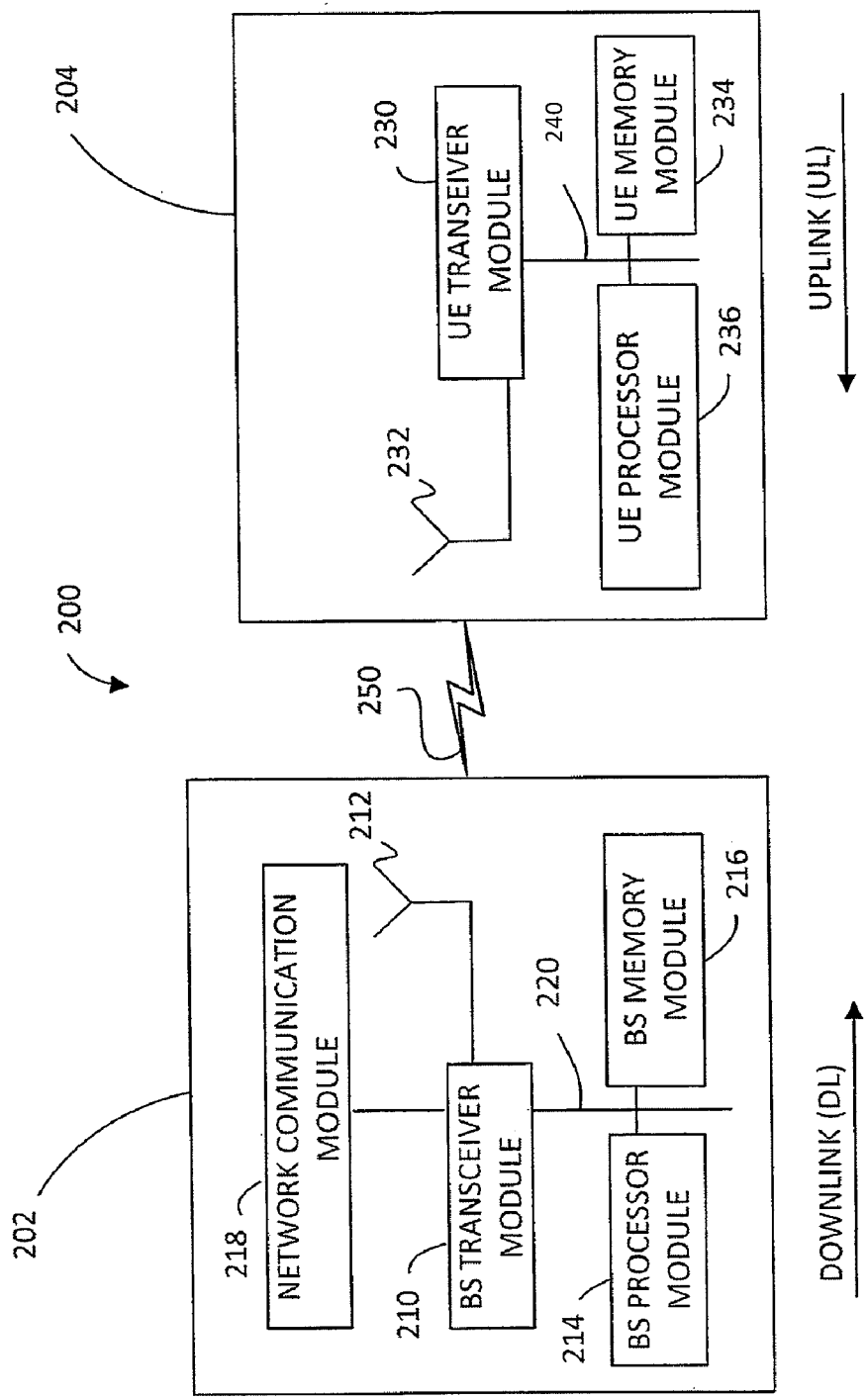
FIG. 2 illustrates block diagrams of an exemplary base station and a user equipment device, in accordance with some embodiments of the present disclosure.

FIG. 2 illustrates a block diagram of an exemplary wireless communication system 200 for transmitting and receiving wireless communication signals (e.g., OFDM/OFDMA signals) in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some exemplary embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

The present disclosure provides various embodiments of systems and methods for dynamic feedback codebooks that may provide post uplink (UL) grant downlink (DL) slot feedback. Dynamic feedback codebooks may characterize receipt of DL signals at DL slot(s) after an immediately earlier UL grant that indicates a feedback timing for a feedback codebook. For simplicity, a slot with an UL signal may be referred to as an UL slot, a slot with a UL grant may be referred to as a UL grant slot, and a slot with a DL signal may be referred to as a DL slot. Dynamic feedback codebooks may be dynamic in that they may be configured to accommodate feedback information for a variety of DL slot configurations either before or after an earlier UL grant. As noted above, typically a feedback codebook characterizes receipt of DL slots before an earlier UL grant. This may be because the earlier UL grant may include information such as a total downlink assignment index (DAI) that indicates the number of DL slots for inclusion in the feedback codebook before the earlier UL grant slot. However, there may still be post UL grant DL slots between the earlier UL grant and the feedback slot associated with the feedback codebook. These post UL grant DL slots may otherwise be unaccounted for if only DL slots before the UL grant are included in a feedback codebook. Also, as noted above, current techniques for dealing with post UL grant DL slots typically provide various limitations and incomplete solutions on feedback codebook configurations for post UL grant DL slots. Accordingly, as will be discussed further below, dynamic feedback codebooks may be configured to accommodate for various configurations of feedback for post UL grant DL slots.

Furthermore, as will be discussed further below, dynamic feedback codebooks may include HARQ ACKs or NACKs that may be transmitted on a physical uplink shared channel (PUSCH) as encoded data on the PUSCH. These dynamic feedback codebooks may be determined dynamically based on timing information of a particular set of resources (e.g., a DCI).

Figure 3:
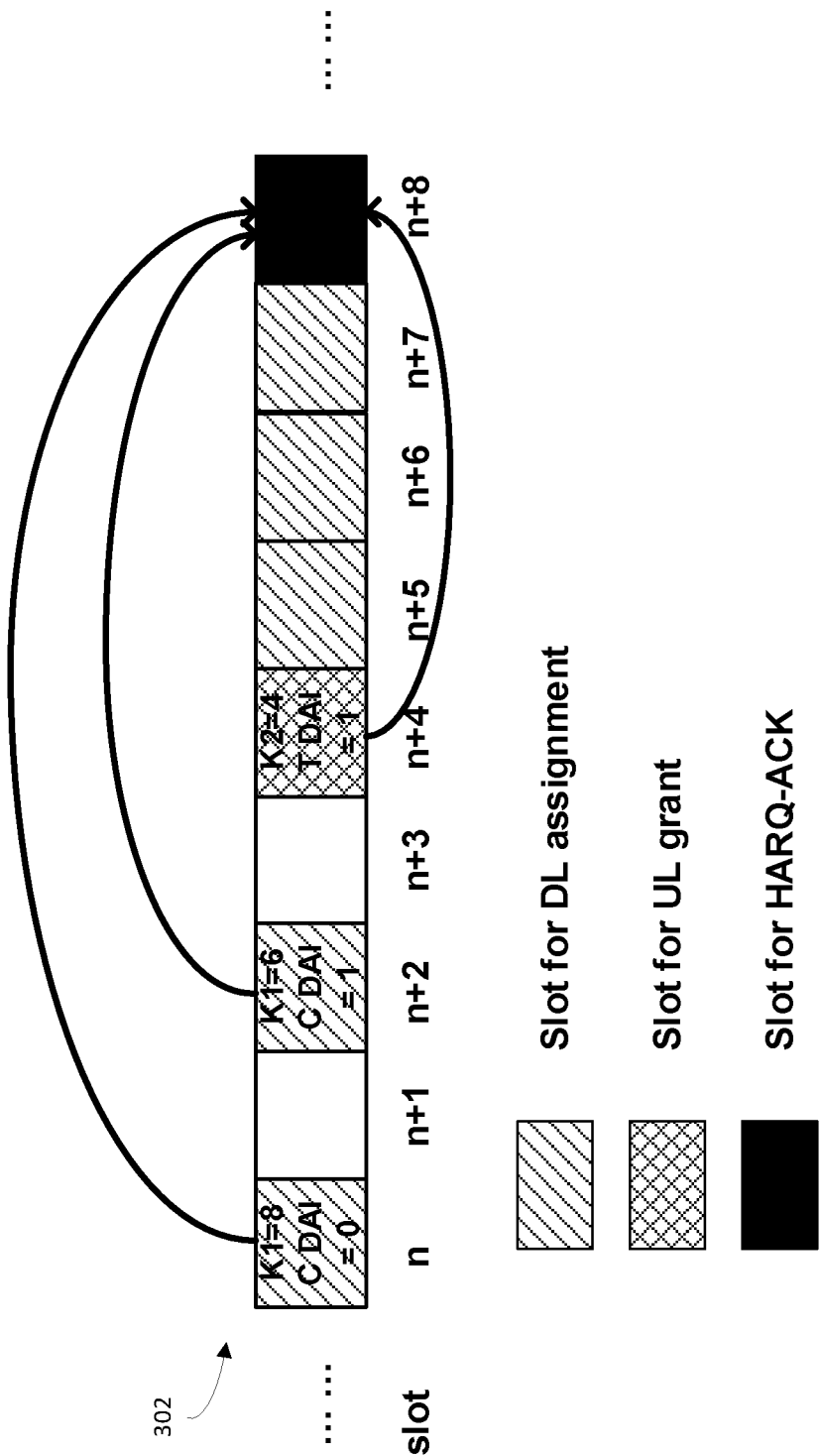
FIG. 3 is a block diagram that illustrates how a dynamic feedback codebook may include feedback for all slots between a UL grant slot and feedback slot, in accordance with some embodiments of the present disclosure.

FIG. 3 is a block diagram that illustrates how a dynamic feedback codebook may include feedback for all slots between a UL grant slot and feedback slot, in accordance with some embodiments of the present disclosure. As shown in FIG. 3, there are total nine slots 302-of transmission resources.

At slot n (e.g., timeslot n), the UE may receive a DCI on a physical downlink control channel (PDCCH). The DCI may include DL data transmission scheduling information, a counter downlink assignment index (CDAI) and a uplink HARQ feedback timing parameter (K1). The CDAI may be an indicator of which DL slot that slot n is relative to the other DL slots that are to be included in a dynamic feedback codebook. For example, the CDAI may include a value of 0, to indicate that slot n is the first DL slot for inclusion in the dynamic feedback codebook. Also, K1 may indicate the relationship between the slot n and the feedback slot for the dynamic feedback codebook. For example, a K1 value of 8 indicates that the feedback slot for the dynamic feedback codebook is slot n+8. Slot n may also include other DL data on a physical downlink shared channel (PDSCH) in addition to the DCI in the PDCCH.

Slot n+2 may be another DL slot (e.g., be assigned as a DL slot). At slot n+2, the UE may receive another DCI on the PDCCH. Similar to slot n, the DCI at slot n+2 may indicate that a dynamic feedback codebook at slot n+8 may include feedback information (e.g., an ACK or a NACK) for association with slot n+2. This may be indicated by having the DCI at slot n+2 include a value of K1=6. The K1=6 value may indicate that the feedback slot for the dynamic feedback codebook is to be include six slots down from slot n+2 (e.g., that the feedback slot is n+2+6, or n+8). There may also be a counter DAI indication field in the DCI of the value 1, which may indicate that this is the second DL slot for inclusion in the dynamic feedback codebook at n+8. The UE may also receive DL data on the PDSCH at slot n+2.

Slots n+1 and n+3 may not have any DL assignment for the dynamic feedback codebook at n+8. Stated another way, slots n+1 and n+3 may not be associated with the dynamic feedback codebook. This may be because, for example, slots n+1 and n+3 may not be a DL slot for the UE or because they are DL slots for the UE that are associated with a dynamic feedback codebook not at slot n+8.

At slot n+4, the UE may receive a DCI on the PDCCH that indicates that slot N+4 includes a UL grant. Stated another way, slot N+4 is a UL grant for uplink data transmission to the BS. Slot N+4 may also include a total DAI in the DCI. The total DAI may indicate the total number of DL slots that are characterized in the dynamic feedback codebook. For example, a total DAI value of 1 may indicate that there are two DL slots as the DAI (including CDAI and TDAI) begins at value 0. In certain embodiments, the total DAI may indicate a number of downlink slots or transport blocks (TBs) or code block groups (CBGs) before the UL grant. Also, at slot n+4, the UE may receive a K2 uplink data transmission timing parameter (K2) with a value of 4. This may indicate that the uplink data transmission slot will follow at slot n+8 (e.g., that the feedback slot is 4 slots down from slot n+4). As will be discussed further below, both UL data and the HARQ feedback may be included together in slot n+8 within the PUSCH.

Based on slots n to n+4, the first feedback information of the dynamic feedback codebook may be determined. The first feedback information (e.g., HARQ feedback information) may characterize receipt at slots prior to slot n+4, or prior to the UL grant. The first feedback information size of the dynamic feedback codebook may be calculated as $2 \times N_{CBG} \times N_{codeword}$, where 2 is total number of DL slots for feedback (e.g., as determined by the total DAI). $N_{CBG}$ represents a code block group (CBG) configuration (e.g., a number of CBG in any single slot). For example, $N_{CBG}$ may be 8. $N_{codeword}$ represents number of codewords associated with the communications between the UE and the BS. For example, $N_{codeword}$ may be 2.

Accordingly, the first feedback information size of the dynamic feedback codebook may be 32 bits. The first feedback information of the dynamic feedback codebook may include these 32 bits by multiplexing. For example, within the first feedback information of the dynamic feedback codebook, the first bit to the eighth bit may correspond to the DL slot n and the first codeword. The ninth bit to the sixteenth bit of may correspond to the DL slot n and the second codeword. The seventeenth bit to the twenty-fourth bit may correspond to the DL slot n+2 and the first codeword. Lastly, the twenty-fifth bit to the thirty-second bit may correspond to the DL slot n+2 and the second codeword.

Post UL grant DL slots between the earlier UL grant and the feedback time slot associated with the feedback codebook may be included in the second feedback information of the dynamic feedback codebook. These post UL grant DL slots may include slots n+5, n+6, and n+7 (e.g., the slots between slots n+4 and n+8). As introduced above, each of these post UL grant DL slots may be characterized in the dynamic feedback codebook at slot n+8 but not be identified in the earlier UL grant at slot n+4. The number of these post UL grant DL slots may be determined as N. For the illustrated embodiment of FIG. 3, $N=K_2-1=3$. Also, the size of the second feedback information of the dynamic feedback codebook may be determined as $N \times N_{CBG} \times N_{codeword} = (K_2-1) \times N_{CBG} \times N_{codeword} = 3 \times 8 \times 2 = 48$ bits, where $N_{CBG}$ and $N_{codeword}$ are already introduced above.

The second feedback information of the dynamic feedback codebook may include these 48 bits by multiplexing. For example, within the second feedback information of the dynamic feedback codebook, the 1st bit to the 8th bit may correspond to DL slot n+5 and the first codeword. The 9th bit to the 16th bit may correspond to the DL slot n+5 and the second codeword. The 17th bit to the 24th bit may correspond to the DL slot n+6 and the first codeword. The 25th bit to the 32th bit may correspond to the DL slot n+6 and the second codeword. From the 33th bit to the 40th bit may correspond to the DL slot n+7 and the first codeword. Lastly, the 41th bit to the 48th bit may correspond to the DL slot n+7 and the second codeword. The term DL slot may refer to the DL assignment for a particular slot.

Accordingly, dynamic feedback codebook may include the first and second feedback information (including the size and bit order of the first and second feedback information) as determined above. This first and second feedback information may include respective HARQ ACKs or NACKs for each of their constituent slots. As will be discussed further below, the dynamic feedback codebook may include the first and second feedback information as separate parts of the dynamic feedback codebook, or may merge the first and second feedback information. If merged, the combined (e.g., shared) first and second feedback information may be 80 bits in size (e.g., the size of the first feedback information plus the size of the second feedback information). In certain embodiments, this merged, combined, or shared first and second feedback information may be referred to as a third information within a dynamic feedback codebook.

Figure 4:
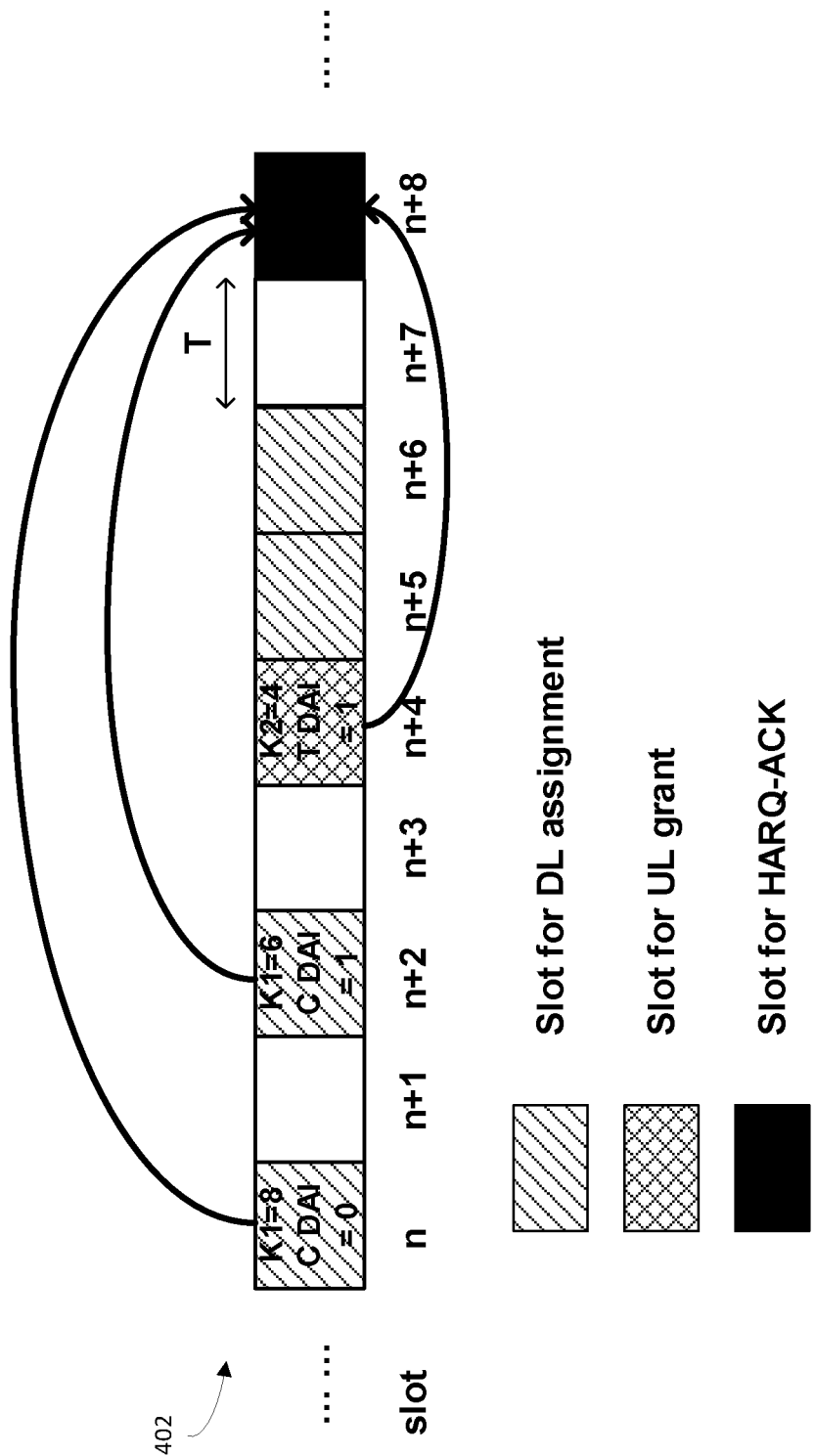
FIG. 4 is a block diagram that illustrates how a dynamic feedback codebook may include feedback for slots between a UL grant slot and feedback slot, less a UL feedback preparation time, in accordance with some embodiments of the present disclosure.

FIG. 4 is a block diagram that illustrates how a dynamic feedback codebook may include feedback for slots between a UL grant slot and feedback slot, minus a number of slots ($N_T$) within a minimum uplink feedback preparation time (T), in accordance with some embodiments of the present disclosure. The UL feedback preparation time (T) may be time required by the UE to prepare the dynamic feedback codebook for transmission. This UL feedback preparation time (T) may be resource intensive and thus may allocate time resources away from any UL or DL transmissions. Stated another way, the UL feedback preparation time (T) may occupy slots that are not be characterized in a dynamic feedback codebook.

Similar to FIG. 3, FIG. 4 includes nine slots 402 of transmission resources. The first feedback information size of the dynamic feedback codebook may be 32 bits. Also, the first feedback information may be determined in the same manner as the first feedback information of the dynamic feedback codebook of FIG. 3. Accordingly, the determination of the first feedback information will not be repeated here for brevity.

Also, similar to FIG. 3, post UL grant DL slots between the earlier UL grant and the feedback slot associated with the feedback codebook may be included in the second feedback information of the dynamic feedback codebook at slot n+8. However, in FIG. 4, these post UL grant DL slots may include slots n+5 and n+6 (e.g., the DL slots between slots n+4 and n+8). Slot n+7 may be associated with the UL feedback preparation time ($N_T$) for the feedback codebook of slot n+8 and thus be unavailable for DL transmission, or otherwise unavailable for inclusion in the dynamic feedback codebook of n+8.

The number of these post UL grant DL slots may be determined as N. For the illustrated embodiment of FIG. 4, $N=K_2-1-N_T=3$. The size of the second feedback information of the dynamic feedback codebook may be determined as $N \times N_{CBG} \times N_{codeword} = (K_2-1-N_T) \times N_{CBG} \times N_{codeword} = 2 \times 8 \times 2 = 32$ bits, where $N_{CBG}$ and $N_{codeword}$, and their associated values, are introduced above.

The second feedback information of the dynamic feedback codebook may include these 32 bits by multiplexing. For example, within the second feedback information of the dynamic feedback codebook, the 1st bit to the 8th bit may correspond to DL slot n+5 and the first codeword. The 9th bit to the 16th bit may correspond to the DL slot n+5 and the second codeword. The 17th bit to the 24th bit may correspond to the DL slot n+6 and the first codeword. The 25th bit to the 32th bit may correspond to the DL slot n+6 and the second codeword. Lastly, from the 33th bit to the 40th bit may correspond to the DL slot n+7 and the first codeword.

Accordingly, a dynamic feedback codebook may include the first and second feedback information (including the size and bit order of the first and second feedback information) as determined above. This first and second feedback information may include respective HARQ ACKs or NACKs for each of their constituent slots. As will be discussed further below, the dynamic feedback codebook may include the first and second feedback information as separate parts of the dynamic feedback codebook, or may merge the first and second feedback information. If merged, the combined first and second feedback information may be 64 bits in size (e.g., the size of the first feedback information plus the size of the second feedback information). Also, the combined first and second feedback information may be referred to as third information.

Figure 5:
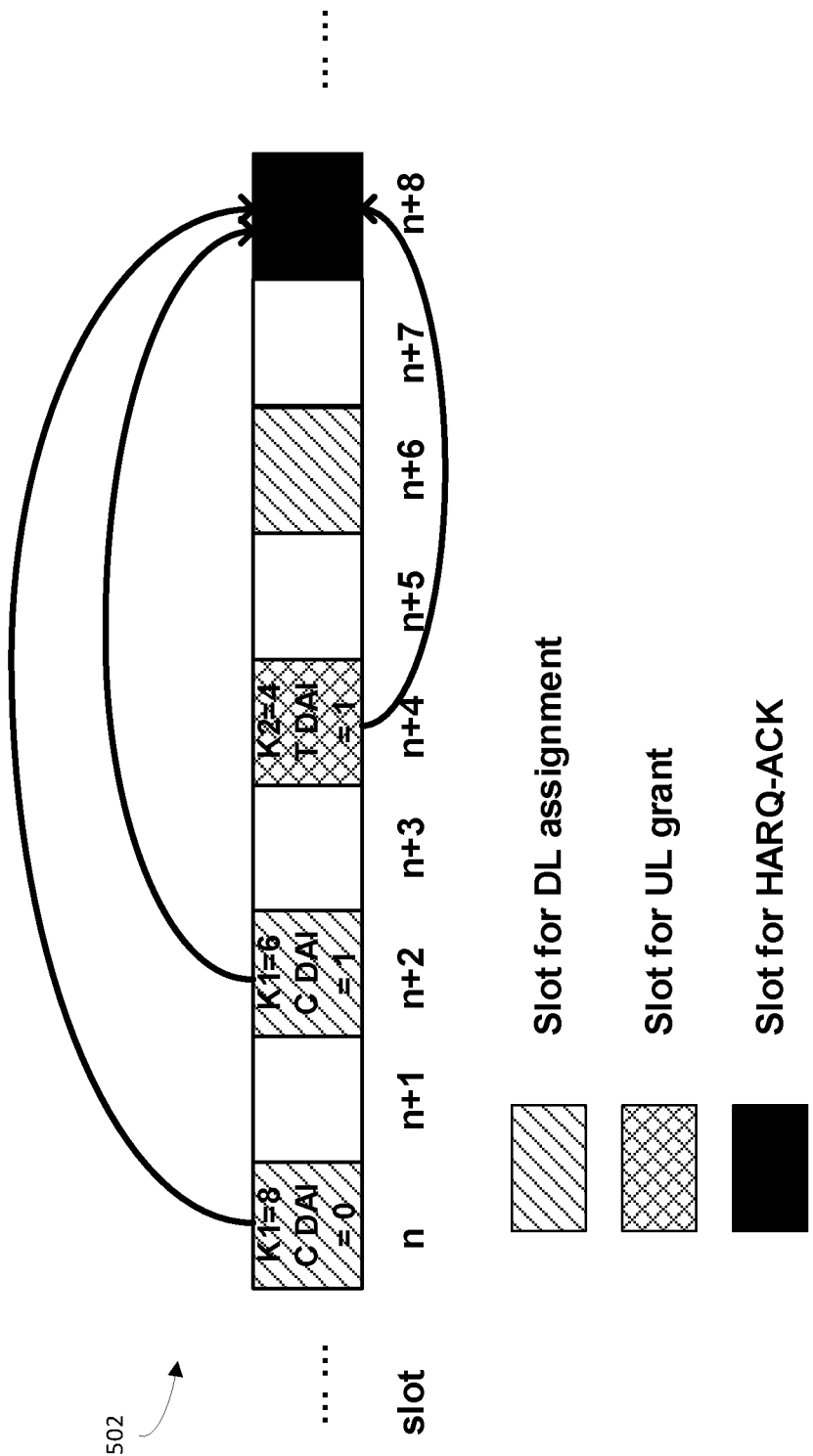
FIG. 5 is a block diagram that illustrates how a dynamic feedback codebook may include feedback for certain slots between a UL grant slot and feedback slot, in accordance with some embodiments of the present disclosure.

FIG. 5 is a block diagram that illustrates how a dynamic feedback codebook may include feedback for certain slots between a UL grant slot and feedback slot, in accordance with some embodiments of the present disclosure. The certain slots may be designated by a uplink HARQ feedback timing parameter set (K1 set) indicated in radio resource control (RRC) signaling. Similar to FIG. 4, FIG. 5 includes nine slots 502 of transmission resources as an example. The first feedback information size of the dynamic feedback codebook may be 32 bits and determined in the same manner as the first feedback information of the dynamic feedback codebook of FIG. 3. Accordingly, the determination of the first feedback information will not be repeated here for brevity.

Furthermore, the second feedback information size of the dynamic feedback codebook (e.g., HARQ feedback information for the DL assignments after UL grant) may be determined from the K1 set indicated in RRC signaling by a BS to the UE. For example, the K1 set may be: K1 set ∈ {2· 4· 6· 8}. Stated another way, the values in the K1 set may indicate that the dynamic feedback codebook should provide feedback for the second/fourth/sixth/and eighth slots from a feedback slot. Also, the values in the K1 say may indicate that these slots should also be DL slots (e.g., have a DL assignment). For a specific DL slot, DCI for a specific slot may also further indicate which value of $K_1$ is currently assigned to that particular slot. For example, 2 bits of a DCI may be used to indicate which value within the K1 set is applicable to the slot associated with the DCI. These two bits may be represented in binary form, such as where '00' represents '$K_1$=2', '01' represents '$K_1$=4', '10' represents '$K_1$=6', '11' represents '$K_1$=8'. Accordingly, of the slots n+5, n+6, n+7 between UL grant slot and feedback slot, only the slot n+6 will be characterized in the dynamic feedback codebook at slot n+8. Stated another way, slot n+6 may include a DCI that indicates a $K_1$ value of 2. Thus, the number of post UL grant DL slots characterized by a dynamic feedback codebook in feedback slot n+8 is 1.

The number of these post UL grant DL slots may be determined as N. For the illustrated embodiment of FIG. 4, N=1. The size of the second feedback information of the dynamic feedback codebook may be determined as $N \times N_{CBG} \times N_{codeword}$=1×8×2=16 bits, where $N_{CBG}$ and $N_{codeword}$ are of the same values as introduced above.

The second feedback information of the dynamic feedback codebook may include these 16 bits by multiplexing. For example, within the second feedback information of the dynamic feedback codebook, the 1th bit to the 8th bit may be associated with slot n+6 and the first codeword. Also, the 9th bit to the 16th bit may be associated with DL slot n+6 and the second codeword.

Accordingly, dynamic feedback codebook may include the first and second feedback information (including the size and bit order of the first and second feedback information) as determined above. This first and second feedback information may include respective HARQ ACKs or NACKs for each of their constituent slots. As will be discussed further below, the dynamic feedback codebook may include the first and second feedback information as separate parts of the dynamic feedback codebook, or may merge the first and second feedback information. If merged, the combined first and second feedback information may be 40 bits in size (e.g., the size of the first feedback information plus the size of the second feedback information). In certain embodiments, the merged or combined first and second feedback information may be referred to as third information.

Figure 6:
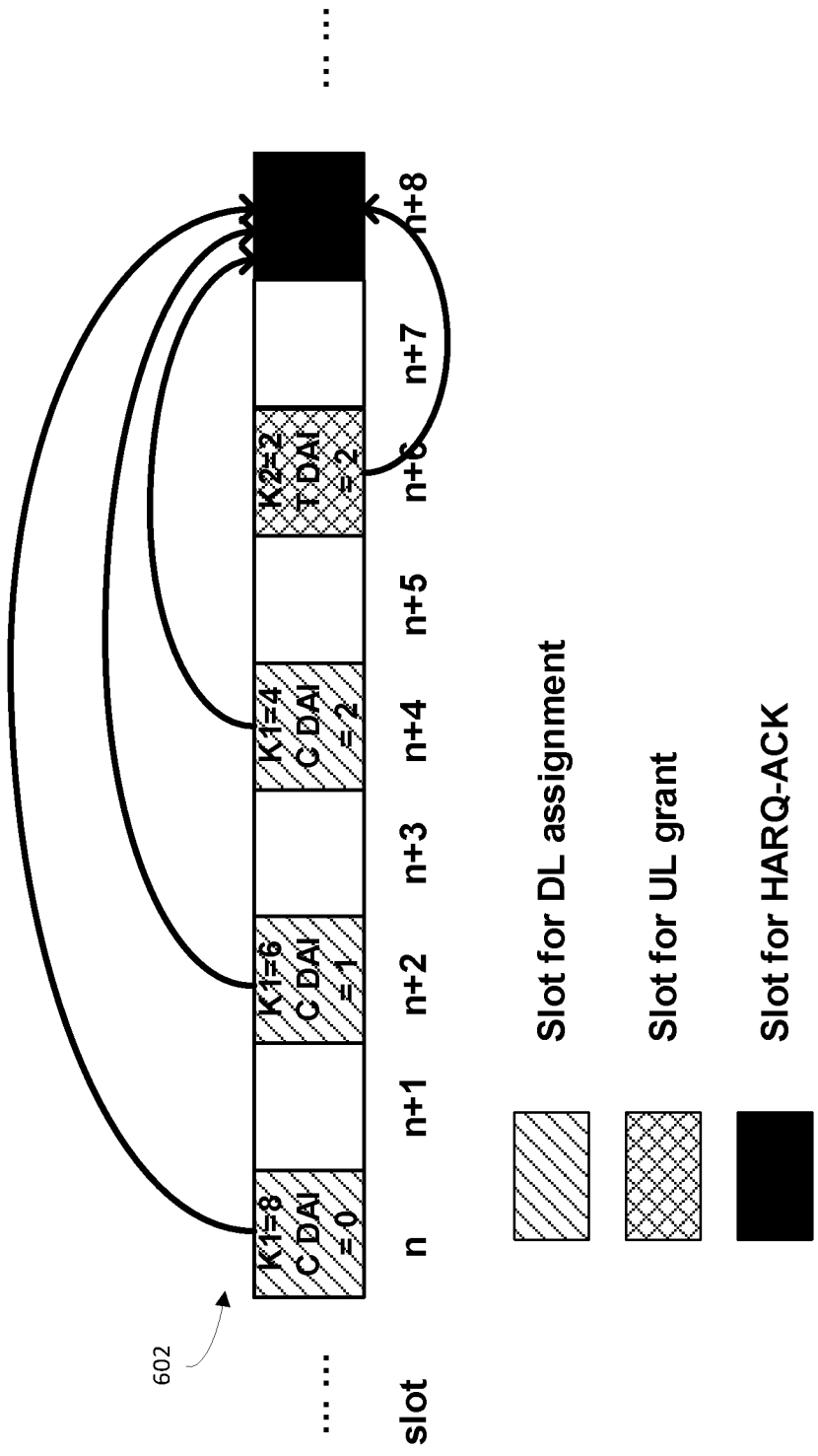
FIG. 6 is a block diagram that illustrates how a dynamic feedback codebook may include feedback for no slots between a UL grant slot and feedback slot, in accordance with some embodiments of the present disclosure.

FIG. 6 is a block diagram that illustrates how a dynamic feedback codebook may only include the first feedback information, as there are no slots between a UL grant slot and feedback slot, in accordance with some embodiments of the present disclosure. Accordingly, the embodiment of FIG. 6 may only include first feedback information size in a dynamic feedback codebook.

As shown in FIG. 6, there are total nine time slots 602-of transmission resources. Each slot included in the first feedback information in the dynamic feedback codebook may include a DCI on a physical downlink control channel (PDCCH). The DCI may include DL data transmission scheduling information, such as a counter downlink assignment index (CDAI) and a uplink HARQ feedback timing parameter (K1). The CDAI may be an indicator or counter of DL slots that uniquely identifies DL slots to be included in a dynamic feedback codebook. For example, the CDAI may include a value of 0 at slot n, a value of 1 at slot n+2, a value of 2 and slot n+4, and a value of 2 and n+4. Also, K1 may indicate the relationship between a particular slot and the feedback slot for the dynamic feedback codebook. For example, slot n may include a K1 value of 8, slot n+2 may include a K1 value of 6, and slot n+4 may include a K1 value of 4. Each of these K1 values may indicate that the feedback slot for the dynamic feedback codebook is slot n+8. Each slot may also include other DL data on a physical downlink shared channel (PDSCH) in addition to the DCI in the PDCCH.

Slots without a DCI may not have any DL assignment or relationship to the dynamic feedback codebook at slot n+8. Stated another way, slots n+1, n+3, n+5, and n+7 may not be associated with the dynamic feedback codebook at slot n+8. This may be because, for example, they are not DL slots for the UE that is to send the dynamic feedback codebook or because they are DL slots for the UE that are associated with a dynamic feedback codebook not at slot n+8.

At slot n+6, the UE may receive a DCI on the PDCCH that indicates that slot N+4 includes a UL grant. Stated another way, slot N+4 is a UL grant for uplink to the BS. At slot n+6, the UE may receive a K2 uplink data transmission timing parameter (K2) with a value of 2. This may indicate that the feedback slot for the dynamic feedback codebook will follow at slot n+8 (e.g., that the feedback slot is 2 slots down from slot n+6). As will be discussed further below, both UL data and the HARQ feedback may be included together in slot n+8 within the PUSCH. N+6 may also include a total DAI within the DCI. The total DAI may indicate the total number of DL slots that are characterized in the dynamic feedback codebook. For example, a total DAI value of 2 may indicate that there are three DL slots as the CDAI begins at value 0 for slot n.

Based on slots n to n+6, the first feedback information of the dynamic feedback codebook may be determined. The first feedback information (e.g., first HARQ feedback information) may characterize receipt at slots prior to slot n+6, or prior to the UL grant. The first feedback information size of the dynamic feedback codebook may be calculated as $3 \times N_{CBG} \times N_{codeword}$, where 3 is total number of DL slots for feedback (e.g., as determined by the total DAI). Stated another way, first feedback information size of the dynamic feedback codebook may be calculated as total DAI×$N_{CBG}$×$N_{codeword}$. As discussed above, $N_{CBG}$ represents a code block group (CBG) configuration (e.g., a number of CBG in any single slot). For example, $N_{CBG}$ may be 2. $N_{codeword}$ represents number of codewords associated with the communications between the UE and the BS. For example, $N_{codeword}$ may be 2.

Accordingly, the first feedback information size of the dynamic feedback codebook may be 12 bits. The first feedback information of the dynamic feedback codebook may include these 12 bits by multiplexing. For example, within the first feedback information of the dynamic feedback codebook, the first bit and the second bit of the codebook may correspond to the DL slot n and the first codeword. The third bit and the fourth bit of the codebook may correspond to the DL slot n and the second codeword. The fifth bit and the sixth bit of the codebook may correspond to the DL slot n+2 and the first codeword. The seventh bit and the eighth bit of the codebook may correspond to the DL slot n+2 and the second codeword. The 9th bit and the 10th bit of the codebook may correspond to the DL slot n+4 and the first codeword. The 11th bit and the 12th bit of the codebook may correspond to the DL slot n+4 and the second codeword.

Furthermore, as introduced above, second feedback information of the dynamic feedback codebook may be determined from the K1 set indicated in RRC signaling by a BS to the UE. For example, the K1 set may be: K1 set ∈{4' 5 ' 6' 8}. Stated another way, the values in the K1 set may indicate that the dynamic feedback codebook should provide feedback for the second/fourth/sixth/and eighth slots prior to a feedback slot. Also, the values in the K1 set may indicate that these slot should be DL slots (e.g., have a DL assignment). For a specific DL slot, DCI in such a slot may also further indicate which value of $K_1$ is associated with that particular slot. For example, 2 bits of a DCI may be used to indicate which value within the K1 set is applicable to the slot associated with the DCI. These two bits may be represented in binary form, such as where '00' represents '$K_1$=4', '01' represents '$K_1$=5', '10' represents '$K_1$=6', '11' represents '$K_1$=8'.

Accordingly, there are no slots between the UL grant slot (slot n+6) and the feedback slot (e.g., slot n+8). Thus, the dynamic feedback codebook at feedback slot n+8 does not include any second feedback information. Stated another way, the dynamic feedback codebook may only include first feedback information. The first feedback information may include HARQ ACKs or NACKs for each constituent slot.

Figure 7:
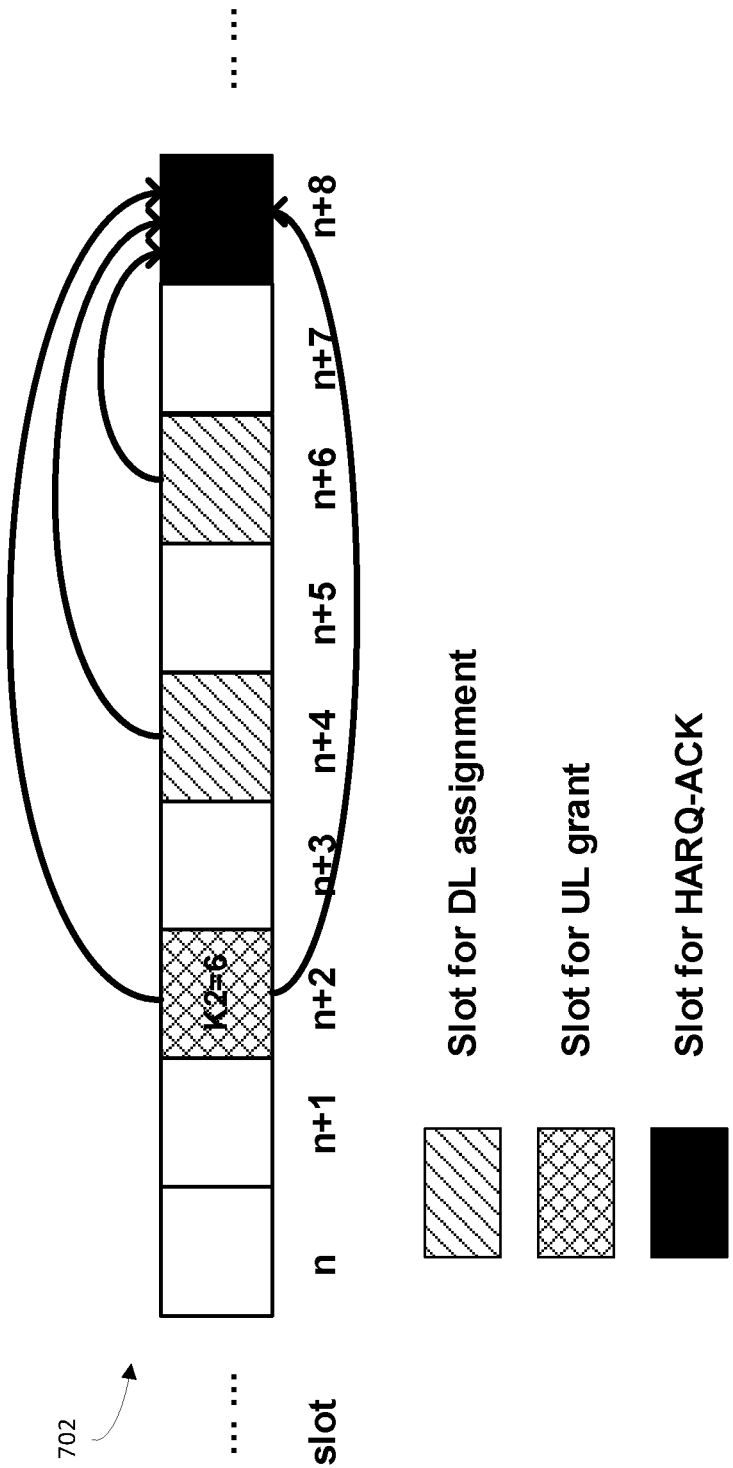
FIG. 7 is a block diagram that illustrates how a dynamic feedback codebook may include feedback for only slots between a UL grant slot and feedback slot, in accordance with some embodiments of the present disclosure.

FIG. 7 is a block diagram that illustrates how a dynamic feedback codebook may include feedback for only slots between a UL grant slot and feedback slot, in accordance with some embodiments of the present disclosure. Accordingly, the embodiment of FIG. 7 may only include second feedback information size in a dynamic feedback codebook.

As shown in FIG. 7, there are total nine slots 702-of transmission resources. However, slot n+2 may include a UL grant in its DCI (received by the UE on a PDDCH at slot n+2). Slot n+2 may also indicate that $K_2$=6 and that the feedback slot is slot n+8, using techniques as discussed above. Furthermore, the DCI may include a total DAI with no information, thus indicating that there is no pre UL grant DL slots associated with the dynamic feedback codebook at slot n+8. Accordingly, the embodiment of FIG. 7 may only include second feedback information size in a dynamic feedback codebook at slot n+8 and no first feedback information.

Furthermore, the second feedback information size of the dynamic feedback codebook (e.g., HARQ feedback information for the DL assignment after UL grant) may be determined from the K1 set indicated in RRC signaling by a BS to the UE. For example, the K1 set may be: K1 set ∈{2 ' 4' 6' 8}. Stated another way, the values in the K1 set may indicate that the dynamic feedback codebook should provide feedback for the second/fourth/sixth/and eighth slots prior to the feedback slot. This K1 set may also indicate that these slots should also be DL slots (e.g., have a DL assignment). For a specific DL slot, DCI in such a slot may also further indicate which value of $K_1$ is associated with that particular slot. For example, 2 bits of a DCI may be used to indicate which value within the K1 set is applicable to the slot associated with the DCI. These two bits may be represented in binary form, such as where '00' represents '$K_1$=2', '01' represents '$K_1$=4', '10' represents '$K_1$=6', '11' represents '$K_1$=8'. For example, of the slots n+3 to n+7 between the UL grant slot and feedback slot, slot n+4 may be associated with $K_1$=2 and slot n+6 may be associated with $K_1$=4. This indicates that slots n+4 and n+6 may be characterized in the dynamic feedback codebook at slot n+8. Stated another way, slot n+4 may include a DCI that includes a $K_1$ value of 4 and slot n+6 may include a DCI that indicates a $K_1$ value of 2. Thus, the number of post UL grant DL slots characterized by a dynamic feedback codebook in time slot n+8 is 2. Accordingly, there are two slots that may be characterized in the dynamic feedback codebook of time slot n+8 (e.g., slot n+4 where $K_1$=4 and slot n+6 where $K_1$=2).

The number of these post UL grant DL slots may be determined as N. For the illustrated embodiment of FIG. 7, the number of post UL grant DL slots for feedback at the feedback slot n+8 is 2 (e.g., N=2). Also, the size of the second feedback information of the dynamic feedback codebook may be determined as N×$N_{CBG}$×$N_{codeword}$=2×$N_{CBG}$×$N_{codeword}$=2×1×1=4 bits, where $N_{CBG}$ is 1 and $N_{codeword}$ is 1. As introduced above, $N_{CBG}$ represents CBG configuration (e.g., a number of CBG in one slot). For example, $N_{CBG}$=1 means only one CBG is in one slot, which can also be understood as a disablement of CBG level feedback.

Accordingly, the second feedback information size of the dynamic feedback codebook may be 2 bits. The second feedback information of the dynamic feedback codebook may include these 2 bits by multiplexing. For example, within the second feedback information of the dynamic feedback codebook, the first bit may corresponds to the DL time slot n+4. The second bit may corresponds to the DL time slot n+6. The second feedback information may include HARQ ACKs or NACKs for each of their constituent slots on a PUSCH.

Figure 8:
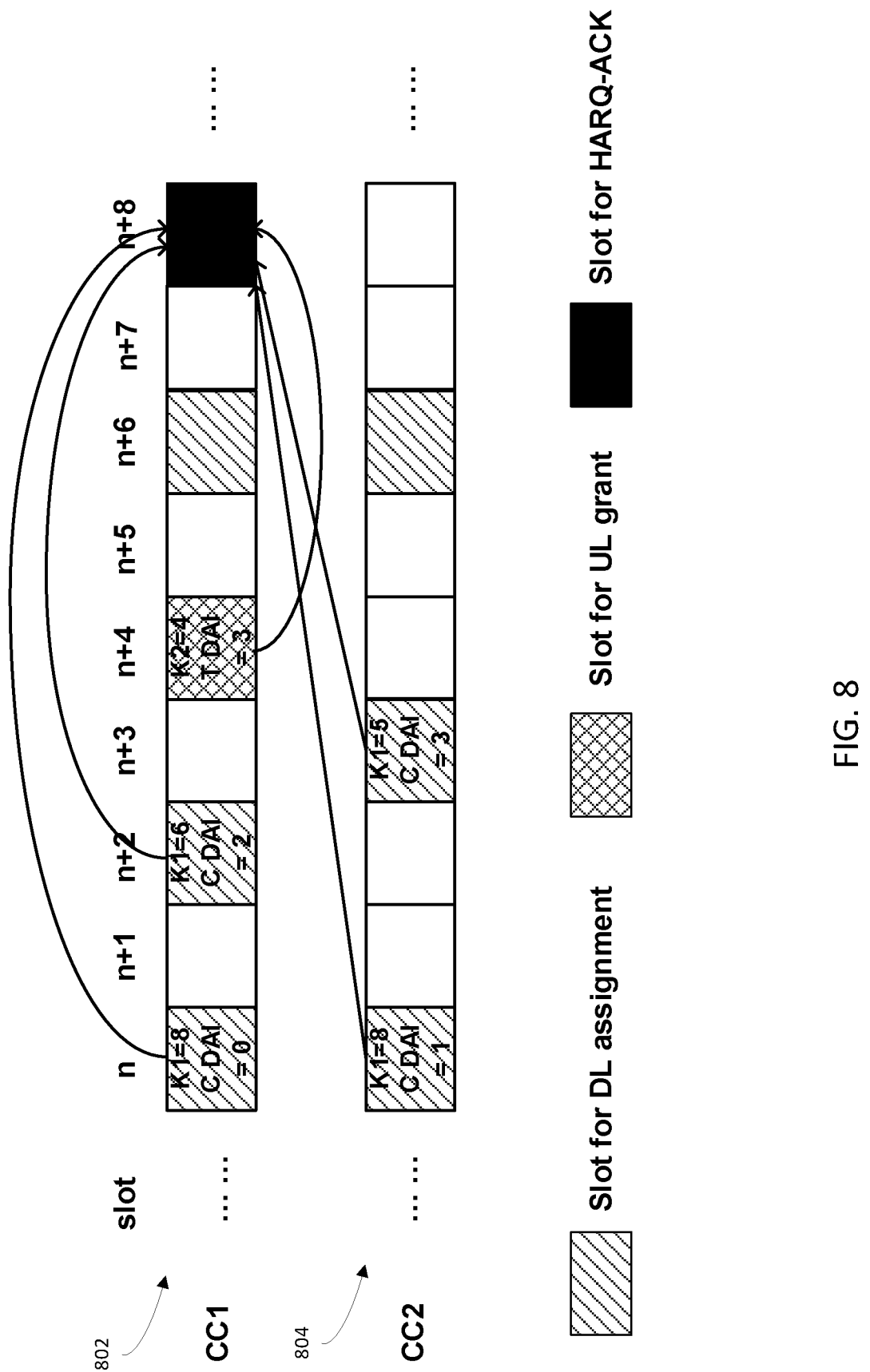
FIG. 8 is a block diagram that illustrates how a dynamic feedback codebook may include feedback for slots between a UL grant slot and feedback slot during carrier aggregation (CA), in accordance with some embodiments of the present disclosure.

FIG. 8 is a block diagram that illustrates how a dynamic feedback codebook may include feedback for slots between a UL grant slot and feedback slot during carrier aggregation (CA), in accordance with some embodiments of the present disclosure.

As shown in FIG. 8, two component carriers (CCs) 802, 804 are scheduled for a UE under carrier aggregation (CA). Also, the feedback slot may be on component carrier 1 (CC1) 108, and not component carrier 2 (CC2) 804. The same CBG configuration and same codeword number configuration may be adopted each of the CCs 802, 804. For example, $N_{CBG}$=2, and $N_{codeword}$=1. Also, in certain embodiments, each K1 or K2 value may refer to slots within CC1 802

First feedback information within the dynamic feedback codebook at CC1 (e.g., at slot n=8 of CC1 802) may include first feedback information for both CC1 802 and CC2 804.

Similarly, second feedback information within the dynamic feedback codebook at CC2 (e.g., at slot n=8 of CC1 802) may include second feedback information for both CC1 802 and CC2 804. For example, UE received DCI information on a PDCCH in slot n of CC1 802 may indicate that the current DL data transmission may be a first DL slot for characterization in feedback in the dynamic feedback codebook at slot n+8. This may be indicated with a CDAI value of 0 and a K1 value of 8 at slot n of CC1 802.

Similarly, the UE may receive DCI information on a PDCCH in slot n of CC2 804 that may indicate that the current DL data transmission may be a second DL slot for characterization in feedback in the dynamic feedback codebook at slot n+8 of CC1 802. This may be indicated with a CDAI value of 1 and a K1 value of 8 at slot n of CC2 804.

Similarly, the UE may receive a DCI on PDCCH in slot n+2 of CC1 that indicates that the current DL data transmission may be a third DL slot for characterization in feedback in the dynamic feedback codebook at slot n+8 of CC1 802. This may be indicated with a CDAI value of 2 and a K1 value of 6 at slot n+2 of CC1 802.

Similarly, the UE may receive a DCI on PDCCH in slot n+3 of CC2 that indicates that the current DL data transmission may be a fourth DL slot for characterization in feedback in the dynamic feedback codebook at slot n+8 of CC1 802. This may be indicated with a CDAI value of 3 and a K1 value of 5 at slot n+3 of CC2 804.

Then, at slot n+4 of CC1 802, a UL grant may be indicated in a DCI received by the UE. This UL grant at n+4 may indicate that n+8 may be a feedback slot for the dynamic feedback codebook by including a K2 value of 4. As introduced above, the K2 value of 4 may indicate that n+8 may be a feedback slot as n+8=n+4+4. Also, as introduced above, the feedback slot n+8 may carry the dynamic feedback codebook in a PUSCH. Slot n+4 may also include a total DAI, discussed further above.

Accordingly, the number of slots for characterization in feedback in first feedback information of the dynamic feedback codebook at slot n+8 of CC1 802 is 4. Accordingly, the codebook size of the first feedback information is $4 \times N_{CBG} \times N_{codeword}=8$ bits, calculated as discussed above where $N_{CBG}=2$, and $N_{codeword}=1$. The first feedback information of the dynamic feedback codebook may include these 8 bits by multiplexing. For example, within the first feedback information of the dynamic feedback codebook, the first bit and the second bit may correspond to two CBGs within the slot n of CC1 802. The third bit and the fourth bit may correspond to two CBGs within the slot n of CC2 804. The fifth bit and the sixth bit may correspond to two CBGs within the slot n+2 of CC1. And the seventh bit and the eighth bit of the codebook may correspond to two CBGs within the slot n+3 of CC2.

Furthermore, the second feedback information size of the dynamic feedback codebook (e.g., HARQ feedback information for the DL assignment after UL grant) may be determined using any of the techniques discussed in connection with FIGS. 3-5. For example, similar to the embodiment of FIG. 3, a K1 set for CC1 802 may be indicated in RRC signaling by a BS to the UE. For example, the K1 set may be: K1 set ∈{2, 4, 6, 8}. Accordingly, of the slots n+5, n+6, n+7 between UL grant slot and feedback slot, only the slot n+6 will be characterized in the dynamic feedback codebook at slot n+8 of CC1 802. Stated another way, slot n+6 of CC2 804 may include a DCI that indicates a $K_1$ value of 2. Thus, the number of post UL grant DL slots characterized by a dynamic feedback codebook in time slot n+8 of CC1 802 is 1.

Also, a K1 set for CC2 804 may be indicated in RRC signaling by a BS to the UE. For example, the K1 set may be: K1 set ∈{2, 5, 8}. Accordingly, of the slots n+5, n+6, n+7 between UL grant slot and feedback slot, only the slot n+6 will be characterized in the dynamic feedback codebook at slot n+8 of CC1 802. Stated another way, slot n+6 of CC2 804 may include a DCI that indicates a $K_1$ value of 2. Thus, the number of post UL grant DL slots characterized by a dynamic feedback codebook in time slot n+8 of CC1 802 is 1.

The number of these post UL grant DL slots in CC1 802 and CC2 804 may be determined as N. For the illustrated embodiment of FIG. 8, N=2. The size of the second feedback information of the dynamic feedback codebook may be determined as $N \times N_{CBG} \times N_{codeword}=2 \times 2 \times 1=4$ bits, where $N_{CBG}=2$, and $N_{codeword}=1$ as already introduced above.

The second feedback information of the dynamic feedback codebook may include these 4 bits by multiplexing. For example, within the second feedback information of the dynamic feedback codebook, the first bit and the second bit may correspond to two CBGs within the time slot n+6 of CC1. Also, the third bit and the fourth bit may correspond to two CBGs within the time slot n+6 of CC2.

Accordingly, a dynamic feedback codebook may include the first and second feedback information (including the size and bit order of the first and second feedback information) as determined above. This first and second feedback information may include respective HARQ ACKs or NACKs for each of their constituent slots. As will be discussed further below, the dynamic feedback codebook may include the first and second feedback information as separate parts of the dynamic feedback codebook, or may merge the first and second feedback information. If merged, the combined first and second feedback information may be 12 bits in size (e.g., the size of the first feedback information plus the size of the second feedback information). In certain embodiments, the merged or combined first and second feedback information may be referred to as third information.

The manner in which a dynamic feedback codebook may be transmitted in a slot (e.g., within a PUSCH of a slot) may be based on various criteria. This criteria may include, for example, a size of a dynamic feedback codebook. For example, a size of a dynamic feedback codebook may include a size of a total of a dynamic feedback codebook. Alternatively, a size of a dynamic feedback codebook may refer to a constituent part of a dynamic feedback codebook, such as a size of first feedback information, a size of second feedback information, or a size of third feedback information that is a combination of first and second feedback information, as discussed above. As discussed above, the dynamic feedback codebook may include both first and second feedback information characterizing receipt of downlink signals both before and after an uplink grant that is prior to the feedback slot. Also, the dynamic feedback codebook may be transmitted from a UE to a BS within the feedback slot. The feedback information may include HARQ ACKs or NACKs respectively (e.g., first HARQ ACKs or NACKs associated the first feedback information or second HARQ ACKs or NACKs associated with the second feedback information).

The manner (e.g., mode) of transmission of a dynamic feedback codebook may include, for example, puncture transmissions and rate matching transmission. In puncture transmissions, a UE may prepare UL data utilizing all PUSCH resources available (e.g., all PUSCH resources in a slot). However, UL data on part of the PUSCH resources (e.g. some resource blocks (RBs) or some resource elements (REs) or some symbols) may be replaced (e.g., punctured) by the feedback information that constitutes a dynamic feedback codebook. The UL data (e.g., bits after encoding for UL) on the parts of PUSCH resources punctured by dynamic feedback codebook may be discarded. In certain embodiments, puncturing for transmission of a dynamic feedback codebook may be performed in conventional manner and will not be discussed in detail herein.

In rate matching, part of the PUSCH resource (e.g. some resource blocks (RBs), or some resource elements (REs), or some symbols) may be reserved for the dynamic feedback codebook. A UE may prepare UL data according to the remaining (e.g., not reserved) PUSCH resources that are not reserved for the dynamic feedback codebook. In this rate matching mode, the UL data (e.g., UL data bits after encoding) may be complete (e.g., not be punctured), but reserving resources for the dynamic feedback codebook may reduce the amount of resources for UL data that is not associated with the dynamic feedback codebook. In certain embodiments, rate matching for transmission of a dynamic feedback codebook may be performed in conventional manner and will not be discussed in detail herein.

In various embodiments, either puncturing or rate matching may be utilized to transmit a dynamic feedback codebook. Also, whether puncturing or rate matching may be utilized may be based upon a size of the dynamic feedback codebook. This size may be a size of the entire dynamic feedback codebook, a size of first feedback information, a size of second feedback information, or a size of third feedback information that is a combination of first and second feedback information, as discussed above.

In certain embodiments, a value of 2 bits may be taken as a threshold value to determine whether puncturing or rate matching may be utilized to transmit a dynamic feedback codebook. For example, puncturing may be adopted when a size of the dynamic feedback codebook is at or smaller than 2 bits, and rate matching may be utilized when a size of the dynamic feedback codebook is over 2 bits in size. This threshold value may be set in a specification or configured by a base station and indicated to a UE.

In certain embodiments, a value of 2 bits may be taken as a threshold value to determine whether puncturing or rate matching may be utilized to transmit first feedback information of dynamic feedback codebook. For example, puncturing may be adopted when a size of the first feedback information is at or smaller than 2 bits, and rate matching may be utilized when a size of the first feedback information is over 2 bits in size. As another example, puncturing may be adopted when a size of the second feedback information is at or smaller than 2 bits, and rate matching may be utilized when a size of the second feedback information is over 2 bits in size. This threshold value may be set in a specification or configured by a base station. This threshold value may be set in a specification or configured by a base station and indicated to a UE.

As an illustrative example, a first feedback information may have a size of 12 bits while a second feedback information may have a size of 2 bits. Also, a threshold value may be 2 bits, where feedback information over 2 bits is to be transmitted using rate matching while feedback information at or below 2 bits is to be transmitted using puncturing. Accordingly, the first feedback information of 12 bits in size may be transmitted using rate matching while the second feedback information of 2 bits in size may be transmitted using puncturing.

In certain embodiments, the size and position of a transmission resource on PUSCH for each transmission mode (e.g., puncturing or rate matching) may be predefined. For example, certain first feedback information and/or certain second feedback information may be predefined for transmission via puncturing or rate matching irrespective of a size of the dynamic feedback codebook.

In various embodiments, if the first and second feedback information may not overlap with each other if transmitted separately. Stated another way, and as will be discussed further below, the first and second information may occupy different resources for transmission.

In certain embodiments, a size of transmission resources on a PUSCH may depend on the size of a dynamic feedback codebook. For example, the number of REs occupied by a dynamic feedback codebook may be calculated as dynamic codebook feedback size (e.g., size of feedback information)×M. The value of M can be same or different for the puncture transmission mode and rate matching mode. For example, for the puncture transmission mode M=12; while for the rate matching mode, M=6. In certain embodiments, a relationship between the size of the dynamic feedback codebook and the size of transmission resource on PUSCH may be linear. In other embodiments, a relationship between the size of the dynamic feedback codebook and the size of transmission resource on PUSCH may be non-linear As an illustrative example, a size of first feedback information may be 12 bits so that a size of a transmission resource on PUSCH associated with the first feedback information may be 12×6=72 REs, where M=6 (e.g., for rate matching). The position of each of these 72 REs may be predefined. For example, in the frequency domain, PUSCHRBs will be occupied at RE 0, 4, 8. In time domain, the REs may utilize use symbols aside from a demodulation reference signal (DMRS) symbols.

Also, a size of second feedback information may be 2 bits so that a size of a transmission resource on PUSCH associated with the first feedback information may be 2×12=24 REs, where M=12 (e.g., for puncturing). Also, the transmission resources occupied by the second feedback information may be allocated or designed to avoid the transmission resources occupied by first feedback information, no matter the transmission mode utilized (e.g., puncturing or rate matching). For example, in the frequency domain, PUSCHRBs will be occupied at RE 2, 6, 10. In time domain, the REs may utilize use symbols except DMRS symbols.

In the above example, resources occupied by two HARQ ACKs (or NACKs) may be separated in the frequency domain. Also, there may be other resource mapping rules to avoid overlapping resources (e.g., cross talk among resources or overbooking of resources). For example, a first HARQ ACK may be mapped on odd RBs, and the second HARQ ACK may be mapped on even RBs. Alternatively, a first HARQ ACK may be mapped on odd symbols, and second HARQ ACKs may be mapped on even symbols. Alternatively, a first HARQ ACK may be mapped on a first time-frequency domain resource, and a second HARQ ACK may be mapped on a resource with a time domain offset and/or frequency domain offset from the first time-frequency domain resource. This offset may be in the order or magnitude of some REs, some RBs, some symbols, some slots or a combination of the above (e.g., a combination of REs, RBs, symbols, and slots).

As noted above, a UE may transmit UL data along with the dynamic feedback codebook within a feedback slot. Accordingly, for rate matching, a UE may prepare the UL data for transmission on transmission resources other than those reserved for the dynamic feedback codebook. Also, for puncturing, a UE may puncture the UL data within the feedback slot with the data of the dynamic feedback codebook.

In certain embodiments, a manner of transmission for first feedback information may be set, while the manner of transmission for second feedback information may be based upon a codebook size (e.g., size of the second feedback information). For example, rate matching may be the set manner (e.g., type) of transmission for the first feedback information. However, the second feedback information may be transmitted by either rate matching or puncturing, as dependent upon the size of the second feedback information. For instance, the second feedback information may be transmitted via puncturing when at or under 2 bits in size, or may be transmitted via rate matching when over 2 bits in size. Stated another way, 2 bits may be a threshold value for determination of whether the second feedback information is transmitted via rate matching or puncturing. These thresholds may be defined in a specification under which associated BSs and UEs may operate, or may be indicated to a UE by a BS.

For example, a dynamic feedback codebook may include a first feedback information of size 12 bits and a second feedback information of size 10 bits. Based on the immediately above referenced rules for determining the manner of dynamic feedback codebook transmission, the UE may transmit the first feedback information (e.g., HARQ ACKs or NACKs associated with the first feedback information) via rate matching. Also, the second feedback information may be transmitted via rate matching as well. Also, in certain embodiments, the first and second feedback information may not overlap and interfere with each other, as discussed further above.

In certain embodiments, a manner of transmission for both first feedback information and second feedback information may be set (e.g., predetermined). For example, this predetermination may include transmission via puncturing for both the first feedback information and the second feedback information. As another example, this predetermination may include transmission via rate matching for both the first feedback information and the second feedback information. As yet another example, this predetermination may include transmission via puncturing for the first feedback information and transmission via rate matching for the second feedback information. As another further example, this predetermination may include transmission via rate matching for the first feedback information and transmission via puncturing for the second feedback information. Also, in certain embodiments, the first and second feedback information may not overlap and interfere with each other, as discussed further above.

In certain embodiments, both first feedback information and second feedback information may be combined, as introduced above. This combination of first and second feedback information may be termed as third feedback information. This third feedback information may be transmitted in the same manner as the first and second feedback information (e.g., via puncturing or rate matching). Also, similar to first and second feedback information, the manner of third feedback information transmission may also be based on various criteria. This criteria may include a size of a dynamic feedback codebook. This may be, for example, a size of third feedback information, a size of first feedback information, or a size of second feedback information, as discussed above.

In certain embodiments, a value of 2 bits may be taken as a threshold value to determine whether puncturing or rate matching may be utilized to transmit third feedback information of a dynamic feedback codebook. For example, puncturing may be adopted when a size of the third feedback information is at or smaller than 2 bits, and rate matching may be utilized when a size of the third feedback information is over 2 bits in size. This threshold value may be set in a specification or configured by a base station. In certain embodiments, the size and position of transmission resources on a PUSCH for each transmission mode may be predefined. Also, in further embodiments, a predefined mode of transmission may be utilized for the third feedback transmission. For example, the third feedback transmission may be set as either puncturing or rate matching.

As introduced above, in certain embodiments a dynamic feedback codebook may include only a single feedback information (e.g., either only first feedback information or only second feedback information). Accordingly, the single feedback information of the dynamic feedback codebook may be transmitted via puncturing or rate matching. Also, the manner of transmitting the single feedback information may also be based on various criteria. This criteria may include, for example, the size of the single feedback information, as discussed above.

In certain embodiments, a value of 2 bits may be taken as a threshold value to determine whether puncturing or rate matching may be utilized to transmit the single feedback information of a dynamic feedback codebook. For example, puncturing may be adopted when a size of the single feedback information is at or smaller than 2 bits, and rate matching may be utilized when a size of the single feedback information is over 2 bits in size. This threshold value may be set in a specification or configured by a base station. In certain embodiments, the size and position of transmission resources on a PUSCH for each transmission mode may be predefined. Also, in further embodiments, a predefined mode of transmission may be utilized for the single feedback information. For example, the manner of transmitting the single feedback information may be set as either puncturing or rate matching.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a communication device, the method comprising:
    receiving uplink grant information from a communication node, wherein the uplink grant information scheduling a physical uplink shared channel (PUSCH) transmission from the communication device to the communication node;
  receiving a physical downlink shared channel (PDSCH) transmission from the communication node after receiving the uplink grant information;
  generating at least one hybrid automatic repeat request acknowledgement (HARQ ACK) corresponding to the PDSCH transmission; and
    sending the at least one HARQ ACK to the communication node in the PUSCH indicated by the uplink grant information,
    wherein a codebook size of the at least one HARQ ACK is related to a total downlink assignment index (DAI) in the uplink grant information, and
    wherein the codebook size of the at least one HARQ ACK is determined based on $N \times N_{CBG} \times N_{codeword}$, wherein N represents a number of slots occupied by the PDSCH transmission, $N_{CBG}$ represents a number of code block groups in one slot, and $N_{codeword}$ represents a number of codewords associated with the PDSCH transmission.

2. The method of claim 1, wherein the total DAI indicates a number of downlink slots or downlink transport blocks (TBs) or downlink code block groups (CBGs) scheduled for the communication device before the uplink grant information is received.

3. The method of claim 1, wherein the number of slots comprises one of:
a number of slots after receiving the uplink grant information and before a feedback slot,
a number of slots after receiving the uplink grant information and before a feedback slot, minus a number of slots ($N_T$) within a minimum uplink feedback preparation time, or
a number of slots after receiving the uplink grant information and before a feedback slot, wherein the feedback slot is indicated in an uplink feedback timing set indicated in a RRC signaling, wherein the uplink feedback timing set contains all uplink feedback timing values, and wherein the number of slots after receiving the uplink grant information and before the feedback slot is an uplink scheduling timing K2 minus one.

4. A method performed by a communication node, the method comprising:
sending an uplink grant information to a communication device, wherein the uplink grant information scheduling a physical uplink shared channel (PUSCH) transmission from the communication device to the communication node;
sending a physical downlink shared channel (PDSCH) transmission to the communication device after sending the uplink grant information; and
receiving at least one hybrid automatic repeat request acknowledgement (HARQ ACK) in the PUSCH indicated by the uplink grant information, wherein the at least one HARQ ACK corresponds to the PDSCH transmission,
wherein a codebook size of the at least one HARQ ACK is related to a total downlink assignment index (DAI) in the uplink grant information, and
wherein the codebook size of the at least one HARQ ACK is determined based on $N \times N_{CBG} \times N_{codeword}$, wherein N represents a number of slots occupied by the PDSCH transmission, $N_{CBG}$ represents a number of code block groups in one slot, and $N_{codeword}$ represents a number of codewords associated with the PDSCH transmission.

5. The method of claim 4, wherein the total DAI indicates a number of downlink slots or downlink transport blocks (TBs) or downlink code block groups (CBGs) scheduled for the communication device before the uplink grant information is sent.

6. The method of claim 4, wherein the number of slots comprises one of:
a number of slots after sending the uplink grant information and before a feedback slot,
a number of slots after sending the uplink grant information and before a feedback slot, minus a number of slots ($N_T$) within a minimum uplink feedback preparation time, or
a number of slots after sending the uplink grant information and before a feedback slot, wherein the feedback slot is indicated in an uplink feedback timing set indicated in a RRC signaling, wherein the uplink feedback timing set contains all uplink feedback timing values, and wherein the number of slots after sending the uplink grant information and before the feedback slot is an uplink scheduling timing K2 minus one.

7. A communication device comprising:
a processor; and
a memory including processor executable code, wherein the processor executable code upon execution by the processor configures the processor to:
receive uplink grant information from a communication node, wherein the uplink grant information scheduling a physical uplink shared channel (PUSCH) transmission from the communication device to the communication node;
receive a physical downlink shared channel (PDSCH) transmission from the communication node after receiving the uplink grant information;
generate at least one hybrid automatic repeat request acknowledgement (HARQ ACK) corresponding to the PDSCH transmission, wherein a codebook size of the at least one HARQ ACK is related to a total downlink assignment index (DAI) in the uplink grant information; and
send the at least one HARQ ACK to the communication node in the PUSCH indicated by the uplink grant information,
wherein the codebook size of the at least one HARQ ACK is determined based on $N \times N_{CBG} \times N_{codeword}$, wherein N represents a number of slots occupied by the PDSCH transmission, $N_{CBG}$ represents a number of code block groups in one slot, and $N_{codeword}$ represents a number of codewords associated with the PDSCH transmission.

8. The communication device of claim 7, wherein the total DAI indicates a number of downlink slots or downlink transport blocks (TBs) or downlink code block groups (CBGs) scheduled for the communication device before the uplink grant information is received.

9. The communication device of claim 7, wherein the number of slots comprises one of:
a number of slots after receiving the uplink grant information and before a feedback slot,
a number of slots after receiving the uplink grant information and before a feedback slot, minus a number of slots ($N_T$) within a minimum uplink feedback preparation time, or
a number of slots after receiving the uplink grant information and before a feedback slot, wherein the feedback slot is indicated in an uplink feedback timing set indicated in a RRC signaling, wherein the uplink feedback timing set contains all uplink feedback timing values, and wherein the number of slots after receiving the uplink grant information and before the feedback slot is an uplink scheduling timing K2 minus one.

10. A communication device comprising:
a processor; and
a memory including processor executable code, wherein the processor executable code upon execution by the processor configures the processor to:
send an uplink grant information to a communication device, wherein the uplink grant information scheduling a physical uplink shared channel (PUSCH) transmission from the communication device to the communication node;
send a physical downlink shared channel (PDSCH) transmission to the communication device after sending the uplink grant information; and
receive at least one hybrid automatic repeat request acknowledgement (HARQ ACK) in the PUSCH indicated by the uplink grant information, wherein the at least one HARQ ACK corresponds to the PDSCH transmission, wherein a codebook size of the at least one HARQ ACK is related to a total downlink assignment index (DAI) in the uplink grant information, and wherein the codebook size of the at least one HARQ ACK is determined based on $N \times N_{CBG} \times N_{codeword}$, wherein N represents a number of slots occupied by the PDSCH transmission, $N_{CBG}$ represents a number of code block groups in one slot, and $N_{codeword}$ represents a number of codewords associated with the PDSCH transmission.

11. The communication device of claim 10, wherein the total DAI indicates a number of downlink slots or downlink transport blocks (TBs) or downlink code block groups (CBGs) scheduled for the communication device before the uplink grant information is sent.

12. The communication device of claim 10, wherein the number of slots comprises one of:
- a number of slots after sending the uplink grant information and before a feedback slot,
- a number of slots after sending the uplink grant information and before a feedback slot, minus a number of slots ($N_T$) within a minimum uplink feedback preparation time, or
- a number of slots after sending the uplink grant information and before a feedback slot, wherein the feedback slot is indicated in an uplink feedback timing set indicated in a RRC signaling, wherein the uplink feedback timing set contains all uplink feedback timing values, and wherein the number of slots after sending the uplink grant information and before the feedback slot is an uplink scheduling timing K2 minus one.

\* \* \* \* \*